(12) United States Patent
Winkler-Teufel et al.

(10) Patent No.: US 10,050,839 B2
(45) Date of Patent: Aug. 14, 2018

(54) METHOD FOR SETTING UP A STAR-SHAPED COMMUNICATION NETWORK CONSISTING OF A CENTRAL NODE AND PERIPHERAL NODES VIA A WEB APPLICATION PROVIDED BY THE CENTRAL NODE ON THE BASIS OF HARDWARE IDENTIFIERS

(71) Applicant: Appbyyou GmbH, Balgheim (DE)

(72) Inventors: Alexandra Winkler-Teufel, Balgheim (DE); Igor Erik, Trossingen (DE)

(73) Assignee: APPBYYOU GMBH, Balgheim (DE)

( * ) Notice: Subject to any disclaimer, the term of this patent is extended or adjusted under 35 U.S.C. 154(b) by 0 days.

(21) Appl. No.: 14/366,763

(22) PCT Filed: Dec. 21, 2012

(86) PCT No.: PCT/DE2012/100399
§ 371 (c)(1),
(2) Date: Jun. 19, 2014

(87) PCT Pub. No.: WO2013/110254
PCT Pub. Date: Aug. 1, 2013

(65) Prior Publication Data
US 2014/0362734 A1    Dec. 11, 2014

(30) Foreign Application Priority Data

Dec. 23, 2011   (EP) .................. PCT/EP2011/006560
Dec. 5, 2012    (DE) ........................ 10 2012 111 833

(51) Int. Cl.
*H04L 12/24*    (2006.01)
*H04L 12/44*    (2006.01)
(Continued)

(52) U.S. Cl.
CPC .......... *H04L 41/12* (2013.01); *G06F 9/44505* (2013.01); *H04B 5/0025* (2013.01);
(Continued)

(58) Field of Classification Search
None
See application file for complete search history.

(56) References Cited

U.S. PATENT DOCUMENTS 7,065,070 B1    6/2006  Chang
7,801,100 B2 *  9/2010  Agardh ................ H04L 63/065
                                                  370/254
(Continued)

FOREIGN PATENT DOCUMENTS

EP          1712995 A1    10/2006

OTHER PUBLICATIONS

International Search Report of PCT/DE2012/100399, dated Apr. 16, 2013.
(Continued)

*Primary Examiner* — Candal Elpenord
(74) *Attorney, Agent, or Firm* — Collard & Roe, P.C.

(57) ABSTRACT

As an alternative to known communication systems which are available on the Internet and set up voice-over-IP links between users, the invention provides for the setup of a star-shaped communication network. To this end, a software generator first of all generates a native application which acts as a central node and, when required, for its part generates Internet applications that allow communication with the native application.

4 Claims, 2 Drawing Sheets

Figure 1:
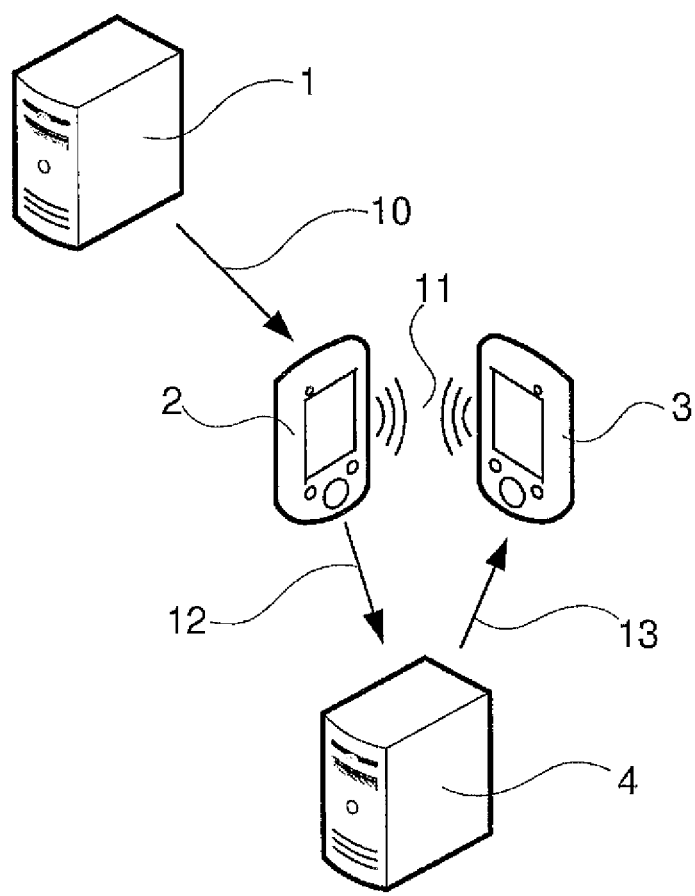

(51) Int. Cl.
  *H04B 5/00* (2006.01)
  *H04W 12/02* (2009.01)
  *H04W 4/21* (2018.01)
  *H04W 4/80* (2018.01)
  *G06F 9/445* (2018.01)
  *H04W 12/06* (2009.01)
  *H04W 12/10* (2009.01)
  *H04L 29/06* (2006.01)

(52) U.S. Cl.
  CPC .............. *H04L 12/44* (2013.01); *H04W 4/21* (2018.02); *H04W 4/80* (2018.02); *H04W 12/02* (2013.01); *H04L 63/0492* (2013.01); *H04L 63/0876* (2013.01); *H04W 12/06* (2013.01); *H04W 12/10* (2013.01)

(56) References Cited

U.S. PATENT DOCUMENTS

| | | | |
|---|---|---|---|
| 2002/0199007 A1 | 12/2002 | Clayton et al. | |
| 2003/0105812 A1* | 6/2003 | Flowers, Jr. | H04L 63/029 709/203 |
| 2004/0034776 A1* | 2/2004 | Fernando | H04L 9/0825 713/171 |
| 2005/0286466 A1 | 12/2005 | Tagg et al. | |
| 2006/0101266 A1* | 5/2006 | Klassen | G06Q 20/347 713/170 |
| 2007/0055877 A1* | 3/2007 | Persson | H04L 63/0272 713/171 |
| 2007/0150946 A1 | 6/2007 | Hanberger et al. | |
| 2007/0192858 A1* | 8/2007 | Lum | H04L 29/12028 726/22 |
| 2007/0266236 A1* | 11/2007 | Colditz | H04L 63/0428 713/153 |
| 2010/0099426 A1* | 4/2010 | Lozinski | H04L 41/0677 455/450 |
| 2011/0161912 A1 | 6/2011 | Eteminan et al. | |
| 2011/0276802 A1* | 11/2011 | Roberts | H04L 63/0492 713/171 |
| 2013/0036231 A1* | 2/2013 | Suumaki | H04W 12/04 709/228 |
| 2013/0044629 A1* | 2/2013 | Biswas | H04L 67/2804 370/254 |

OTHER PUBLICATIONS

NetworkInterface from Java™ Platform Standard Ed. 7 DRAFT ea-b123, 2010, downloaded from http://download.java.net/jdk7/archive/b123/docs/api/java/net/NetworkInterface.html on Oct. 11, 2016.

* cited by examiner

METHOD FOR SETTING UP A STAR-SHAPED COMMUNICATION NETWORK CONSISTING OF A CENTRAL NODE AND PERIPHERAL NODES VIA A WEB APPLICATION PROVIDED BY THE CENTRAL NODE ON THE BASIS OF HARDWARE IDENTIFIERS

CROSS REFERENCE TO RELATED APPLICATIONS

This application is the National Stage of PCT/DE2012/100399 filed on Dec. 21, 2012, which claims priority under 35 U.S.C. § 119 of European Application No. PCT/EP2011/006560 filed on Dec. 23, 2011, and German Application No. 10 2012 111 833.7filed on Dec. 5, 2012, the disclosures of which are incorporated by reference. The international application under PCT article 21 (2) was not published in English.

The present invention relates to a method for setting up a star-shaped communication network.

Particularly with the greatly increasing spread of smartphones, communication is gaining more and more importance in daily life. Within the heterogeneous Internet, subordinate communication networks are forming, which are set up partly as public networks and partly as protected networks.

It is known, as a known and popular form of communication, to use Voice-over-IP services, for example, such as the well-known Internet service "Skype," in which a request to an Internet server is issued, which then produces a peer-to-peer connection between the terminals conducting the call. The current Internet addresses, in each instance, of the participating clients are registered with the server by means of a request, so that for one thing, information is exchanged as to what members of a community are active at a specific point in time, and for another, addressing of the call parties when setting up the communication connection between the call parties is allowed. A restriction of the members of the community is possible, in this connection, in that such systems keep what is called a "buddy list," by way of which the ability to contact individual nodes is organized.

Thus, multiple clients will therefore submit a request for such communication to a server available on the Internet, in order to then begin a Voice-over-IP call by means of the mediation of the server. Other data can also be transmitted in this way, but always with the involvement of the Internet server.

However, the call quality in such connections depends to a great extent on the infrastructure between the participants, as it does on the infrastructure that can be provided by the provider as a function of the load at a specific time.

For this reason, and particularly in the case of security-relevant applications, it is desirable to do without central servers, in order to thereby allow the communication of confidential data to run over as few unmonitored paths as possible.

A possible reaction to this set of problems consists in the operators of communication networks developing their own software systems, which can then be utilized within the company, for example. In the private sector, however, such a project generally fails because relatively high fees must be paid for distribution of such a special smartphone application, in order for it to be set up in the relevant markets.

Against this background, the present invention is supposed to create a solution for setting up a communication network on the basis of personalized software in the private sector, which network possesses effective access monitoring and, at the same time, can be distributed without greater costs.

This task is accomplished by means of a method for setting up a star-shaped communication network as described herein. Further practical embodiments of this method are also described herein.

According to the invention, it is provided, for setting up a star-shaped communication network in this sector, that first, a future central node that is formed by a central device downloads a software generator, for example from a market server, so that the significant investment for setting up the star-shaped communication network at most lies in the acquisition of this software generator. If the latter is offered free of charge, only the network operator costs are otherwise incurred in this step. Using the software generator, a program product is then created, which has a communication interface. This product is then executed directly on the central device, as a native application, which device thereby represents the central node of the new star-shaped communication network to be formed. Peripheral nodes, in other words those nodes that can communicate with the central node, are then formed in that first, the program product in turn generates an Internet application that it provides for execution by the peripheral device.

On the one hand, providing this directly on a virtual server of the central device is possible; on the other hand, this can take place on an Internet server, on which the Internet application is provided for execution by the peripheral device.

Implementation then takes place in an Internet browser of the peripheral device, and thereby not as a native application but rather as a "web app," so that neither the costs of provisioning nor possible costs of procurement by the peripheral device occur as the result of this method of provisioning. In this connection, the Internet application generated by the program product is configured in such a manner that it is suitable exclusively for communication with the central node and the native application that is running on it. This can be done by means of suitable access codes, for example, which can be based on unique hardware addresses of the central device, for example.

In this manner, a communication system in the form of a star-shaped communication network can be set up, in that each desired participant can be added as a peripheral device, in that the Internet application suitable for communication with the central node is executed on the peripheral device.

In a further development of this method, the program product can adapt the Internet application provided on the Internet server or on the other facility suitable for this purpose to a single user, in that a unique code of the peripheral device is filed in the native application of the central node, for example. Such an access code, which is made known between the users, is then entered in a White List in the central node, so that the validity of the access code is checked every time communication is set up between the peripheral device in question and the central device.

In order to prevent the exchange of the code by way of third channels and to not only simplify operation but also add greater security, the method provides, in a concrete embodiment, that the Internet application that was generated for a specific, uniquely identified peripheral device, links its executability with the unique hardware address of the peripheral device and therefore cannot be executed from a different peripheral device. In this way, it is ensured that passing the software on is not possible, in order to keep the circle of the participating communication participants within a monitored framework. In the event that a new device is procured, or the like, all that is required for further participation in the communication network is that a new Internet application is generated on the central node and provided to the user having the changed peripheral device.

The method is further simplified in that the unique hardware address is exchanged in advance, before generation of the Internet application, directly between the central device and the peripheral device. This can be done, for example, by way of near-field communication, so that the possibility that the access data are intercepted can be excluded. In particular, the transfer of the required data can take place in that the data to be transmitted from one device to the other, in each instance, are first encrypted in a two-dimensional barcode, and this code is reproduced on the display of the transmitting device, in each instance. By means of scanning this two-dimensional barcode from the display of the transmitting device, the receiving device can record, decrypt, and then utilize these data. Thus, the hardware address of the peripheral device required for identification is first transmitted to the central device in this manner, for example, and, in the opposite direction, the call-up address or the required access codes for the Internet application, which is now uniquely assigned to the peripheral device, is sent from the central device to the peripheral device.

In order to be able to process the data in suitable manner, it can be practical, in this case, if the software generator with which the native application was initially created on the central device is also installed on the peripheral device and is set up for handling near-field communication. In this manner, it is possible to do without the use of additional software and the creation of suitable data interfaces.

In this star-shaped communication network, it is now primarily provided that communication takes place between a peripheral node and the central node, in each instance. The advantage of this arrangement essentially consists of operability for the smartphone user. This user thereby has a special application on his/her smartphone for every call party, whereby this call party is always the central node of a separate communication network. The common smartphone operating systems allow linking such an Internet application directly on the user interface, so that a call with the desired person, in each instance, is made possible without detours, using a click on the user interface.

Because each call party sets up a corresponding star-shaped communication network for himself/herself as the central node, it is possible that every node in question is simultaneously a central device in his/her network, in each instance, and, vice versa, functions as a peripheral device on one or more outside networks. By means of the superimposition of such communication network architectures, communication using the smartphone can be greatly simplified and can be adapted to the needs of the users.

Data transmission is possible by way of such a communication connection, within the entire communication network, as is making calls.

Supplementally, it is also possible to use the central node as a switching node, so that a communication connection can also be set up between multiple peripheral nodes, with the involvement of the central node.

The invention described above will be explained in greater detail in the following, using an exemplary embodiment.

Figure 2:
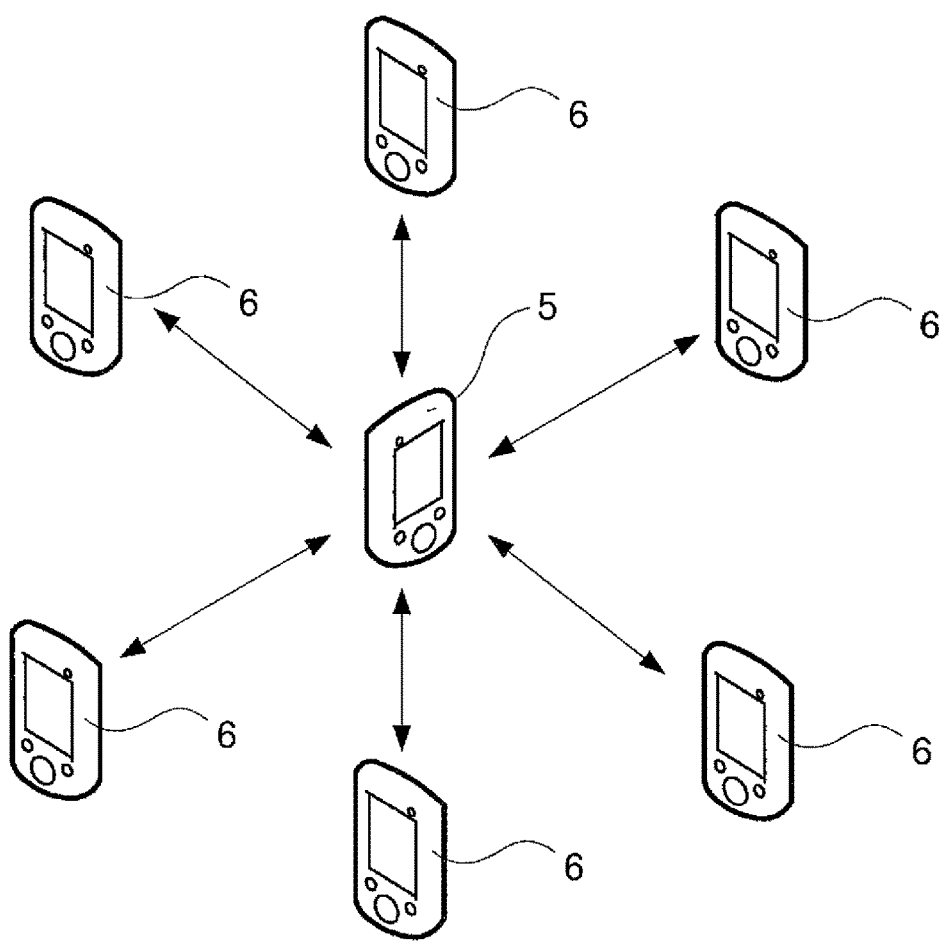

The figures show:

FIG. 1 a schematic representation of the distribution of the applications required for communication, and FIG. 2 a schematic representation of the communication in a star-shaped communication network around the central device.

FIG. 1 shows the sequence of setting up a star-shaped communication network around a central device 2, to which transmission of a software generator 10 is triggered first from a market server 1, on which different applications for mobile devices are kept available. Using this software generator, which itself is an application for mobile devices, a native application is created on the central device 2, which application runs on the central device 2 after it is created. This native application implements a central node of the star-shaped communication network of the star-shaped communication network to be set up, with which the added peripheral nodes can communicate later.

In order to now add a peripheral node, a peripheral device 3 that implements the peripheral node is connected with the central device 2 by way of a near-field communication 11, so that the two devices 2, 3 can undertake an exchange of required data. These data comprise, first of all, on the side of the peripheral device 3, its hardware address, which is first coded as a two-dimensional barcode (QR code) that is shown on the display of the peripheral device 3. This two-dimensional barcode is scanned using an optical sensor of the central device 2, and an Internet application, which carries out an inquiry with regard to the hardware address of the executing device, is generated using the encrypted data contained in the barcode, by the native application. Use of the Internet application will then be able to take place only on a device having the predetermined hardware address. In this way, the Internet application specifically created on the basis of performing the near-field communication 11 is linked with the devices participating in this near-field communication 11.

On the part of the central device 2, provisioning of the Internet application on an Internet server takes place, on which server, in turn, execution of the Internet application 13 can be triggered at the instigation of the peripheral device 3. The access data required for call-up or for execution, which have also been established on the central device 2 by the native application, will convert these data once again into a two-dimensional barcode and show this on the display of the central device 2, so that in the opposite direction, the access data can be taken over from the central device 2, using an optical sensor of the peripheral device 3.

Subsequently, after multiple repetition of this procedure with different peripheral devices 3, a star-shaped communication network according to FIG. 2 has been set up, in which a central device 2 implements a central node 5, while the peripheral devices 3 represent peripheral nodes 6, in each instance. The peripheral nodes 6 can then communicate with the central node 5, in each instance, while reciprocal communication among the peripheral nodes 6 is only possible if the central node 5 is functioning as a telephone switch. A flexible overall network that can be adapted to the most varied needs can be created and securely operated, in simple manner, by means of superimposition of a plurality of such star-shaped communication networks.

REFERENCE SYMBOL LIST 1 market server
2 central device
3 peripheral device
4 Internet server
5 central node
6 peripheral node 10 transmission of the software generator
11 near-field communication
12 provisioning of the Internet application
13 execution of the Internet application

The invention claimed is:

1. A method for setting up a star-shaped communication network, the method comprising steps of:
first, creating a central node on a central device via
generating via a software generator running on the central device a program product having a communication interface, and
executing, via the central device, the program product as a native application,
connecting peripheral nodes to the central node via
providing a unique hardware address of a related peripheral device to the central node by way of a near-field communication in a manner such that the related peripheral device is uniquely identified to the central node, the near-field communication taking place in that the unique hardware address is encrypted in a two-dimensional barcode and reproduced on a display of the related peripheral node, in each instance, and recorded using an optical sensor of the central node, in each instance, and decrypted in the central node,
generating, via the program product, an Internet application for exclusive communication with the central node, the Internet application being stored on an internet server, an executability of the Internet application being linked to the unique hardware address, and
executing the Internet application via a peripheral device in that the peripheral device accesses the internet server by way of a data connection and the Internet application is run in an internet browser of the peripheral device, and
using the central node as a switching node for a communication connection between multiple peripheral nodes, reciprocal communication among the peripheral nodes via the Internet application only being possible via the central node functioning as the switching node,
wherein the program product generates a separate, identifiable Internet application for every peripheral node to be added.

2. The method according to claim 1, wherein the program product assigns a unique access code to every Internet application, which code identifies the Internet application during communication with the central node.

3. The method according to claim 2, wherein the program product maintains a White List in which the access codes of all the Internet applications generated by the program product are stored, and wherein the White List is checked with regard to validity of an access code during the course of setting up communication between the central node and a peripheral node, using the access code.

4. The method according to claim 1, wherein in order to carry out the near-field communication, the software generator is equipped with a near-field communication interface, and the near-field communication is also performed on the peripheral device.

* * * * *